United States Patent [19]

Bleil et al.

[11] 4,321,551

[45] Mar. 23, 1982

[54] LASER LINE OF LIGHT GENERATOR

[75] Inventors: Carl E. Bleil, Rochester; Paul J. Epton, Royal Oak, both of Mich.

[73] Assignee: General Motors Corporation, Detroit, Mich.

[21] Appl. No.: 159,002

[22] Filed: Jun. 12, 1980

[51] Int. Cl.³ .......................... H01S 3/07; H01S 3/10
[52] U.S. Cl. ..................................... 330/4.3; 372/31
[58] Field of Search ...................... 330/4.3; 332/7.51; 350/96.15, 96.18; 331/94.5 D–94.5 F

[56] References Cited

U.S. PATENT DOCUMENTS

| | | | |
|---|---|---|---|
| 3,142,760 | 7/1964 | Iams | 330/4.3 |
| 3,396,344 | 8/1968 | Broom | 331/94.5 D |
| 3,414,837 | 12/1968 | Snitzer | 331/94.5 D |
| 3,484,710 | 12/1969 | Koester | 330/4.3 |
| 3,621,456 | 11/1971 | Young | 331/94.5 E |
| 3,928,811 | 12/1975 | Hughes | 330/4.3 |
| 3,949,318 | 4/1976 | Zeidler | 330/4.3 |
| 4,001,705 | 1/1977 | Sinclair et al. | 330/4.3 |
| 4,155,046 | 5/1979 | Hager | 330/4.3 |
| 4,164,717 | 8/1979 | Blazey | 332/7.51 |
| 4,170,417 | 10/1979 | Tourres | 356/385 |

OTHER PUBLICATIONS

Lee, "High Efficiency Multiple Beam Gratings", 7/1/79, pp. 2152–2158, Applied Optics, vol. 18, #13.

Primary Examiner—Nelson Moskowitz
Attorney, Agent, or Firm—Warren D. Hill

[57] ABSTRACT

A line of laser light is produced having a uniform intensity over an area of ten centimeters by one centimeter and having an energy density of several J/cm². A grating forms from a laser beam several divergent beams of nearly equal intensity and a converging lens collimates the beams into slightly overlapping paths to produce a uniform line of light in one plane. A laser amplifier in a flat plate configuration in that plane includes a nested series of laser rods of triangular cross-section which are pumped by a plurality of flashlamps to amplify the line of light and produce an intense uniform line of laser light.

3 Claims, 5 Drawing Figures

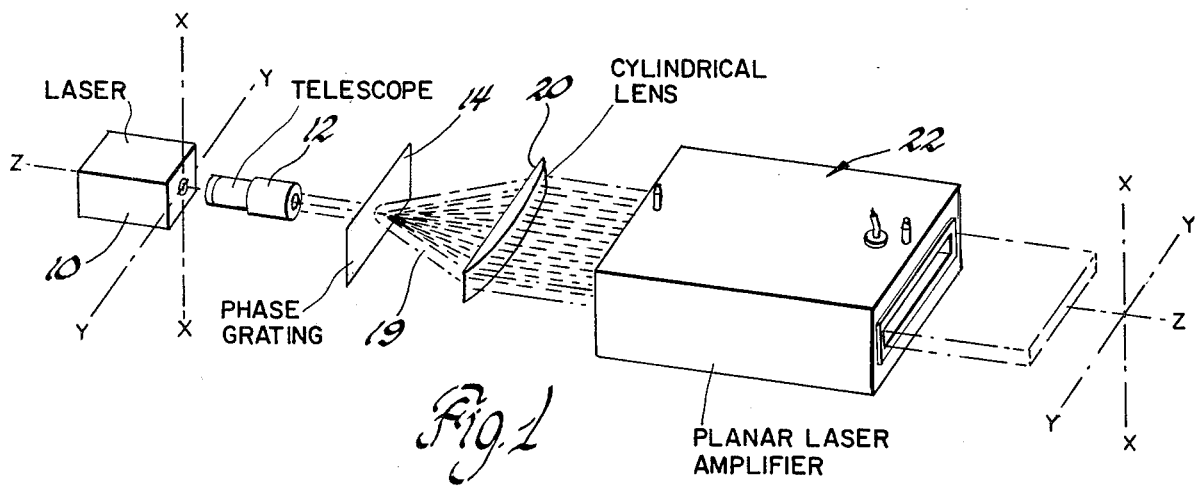
Fig. 1
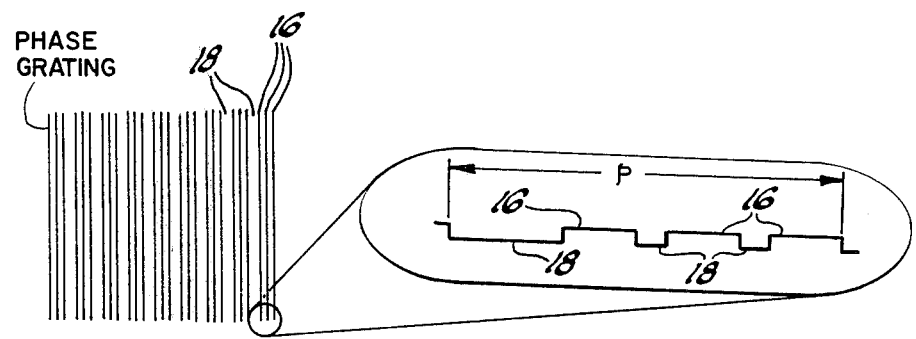
Fig. 2a
Fig. 2b
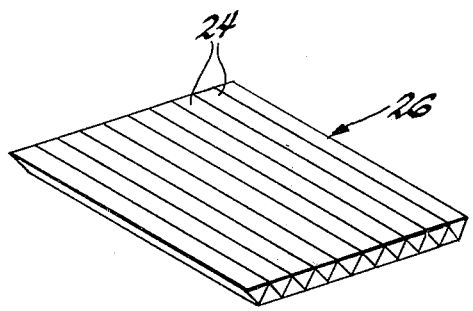
Fig. 3
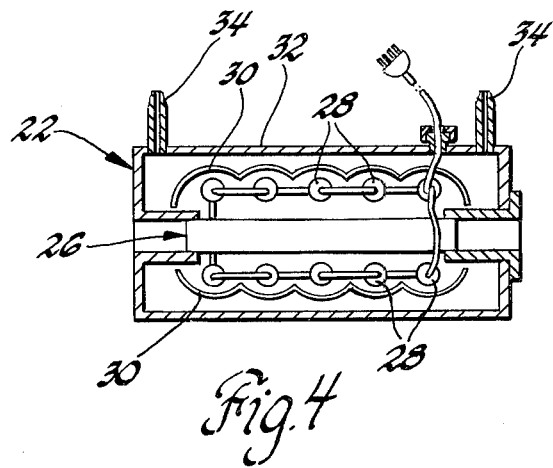
Fig. 4

LASER LINE OF LIGHT GENERATOR

This invention relates to apparatus for producing a line of laser light and more particularly for such an apparatus for producing a line of high intensity and uniform intensity light over a large area.

It is useful in the processing of semiconductors, for example, to irradiate a surface with an intense light beam and this has been accomplished by scanning the semiconductor surface back and forth across its surface with a small spot of laser light. It is desirable, however, to provide a line of light of sufficient intensity and size to permit sweeping the light in one direction along the surface to be irradiated, the light having sufficient uniformity throughout the beam to process the surface uniformly.

It is therefore a general object of this invention to provide an apparatus for generating a large area uniform line of high intensity laser light.

The invention is carried out by providing a laser, an optical arrangement for forming a uniform line of light from the laser and a plate amplifier which amplifies the line of light to produce a uniform high intensity pattern, all the elements being sufficiently large to produce a large area of uniform light.

The above and other advantages will be made more apparent from the following specification taken in conjunction with the accompanying drawings wherein like reference numerals refer to like parts and wherein:

FIG. 1 is an isometric view of apparatus for producing a line of laser light according to the invention, FIGS. 2a and 2b are illustrations of a grating used in the apparatus of FIG. 1, FIG. 3 is an isometric view of the laser medium used in the laser amplifier of FIG. 1, and FIG. 4 is a cross-sectional view of the laser amplifier of FIG. 1.

Referring to FIG. 1 a laser 10 placed in an orthogonal reference system comprising x, y and z axes emits a light beam along the z axis. The laser includes a 9.5 millimeter diameter by 76 millimeters long ruby rod as its lasing medium. The light emitted therefrom is transmitted along the z axis into an optical telescope 12 which expands the light beam into a circular beam 25 millimeters in diameter. A plane phase grating 14 measuring 25 millimeters on each side is placed on the z axis and perpendicular thereto for nearly complete illumination by the laser beam, although for clarity of illustration the grating 14 is shown in FIG. 1 as somewhat larger than the laser beam. The grating is comprised of a patterned series of etched grooves in a flat glass plate. The grating lines are parallel to the x axis. As better shown in FIGS. 2a and 2b, the grooves have a depth of 0.563 micrometers and the pattern has a periodicity (shown by dimension "p") of 16 micrometers. That pattern results in raised lines 16 shown as dark lines in FIG. 2a separated by the grooves 18 that are shown in FIG. 2b. The lines are grouped in triplets having a close spacing and each group is separated from the next by a larger spacing. Specifically, as shown in FIG. 2b, each line 16 has a width of 3 micrometers and the lines are spaced within each group by a groove 18 of 1.2 micrometers while the spacing between triplet groups is 4.6 micrometers. This pattern is identified as a pulse phase modulated grating profile and is more fully explained by Lee in Applied Optics, Volume 18, 1979, pages 2152–2158. The grating has the characteristic of producing a set of nine beams 19 of substantially equal intensity along the y axis as shown in FIG. 1 and diverging about 0.044 radians one from the other in the y–z plane. The divergent beams are rendered parallel by a cylindrical lens 20 placed with its cylindrical axis parallel to the grating lines and its principal plane perpendicular to the z axis. The lens is 12 centimeters wide and 1 centimeter high and has a 27.5 centimeter focal length. The light exiting this lens consists of 9 parallel overlapping beams with about 14 millimeters spacing between centers. The individual beam spacing may be altered by adjustments of the telescope to optimize the uniformity of the composite beam intensity. In this manner a line of laser light of uniform intensity elongated along the y axis and propagated in the direction of the z axis is formed. That line of light is incident on the entrance of a planar laser amplifier 22 which amplifies the line of light and produces an output line of light resembling the input in size, shape and uniformity but of much greater intensity.

As shown in FIG. 3, the laser medium of the planar amplifier 22 comprises an array of 19 ruby rods 24 nested together to form a flat plate 26, each rod being parallel to the z axis of the system and lying in the y–z plane so that the line of light is incident on the ends of the rods. The individual rods 24 are equilaterally triangular in cross-section with 11 millimeter sides. Each rod length is 195 millimeters and exhibits a gain of about 20 dB. The ends of the triangular rods are anti-reflection coated to prevent spurious oscillations and the sides of the rods which interface adjoining rods are coated to enhance the interface reflectivity of the laser light to thereby minimize the gain of the amplifier transverse to the z axis.

As shown in FIG. 4, a housing 32 surrounds the amplifier plate 26 and provides a water jacket to permit the circulation of cooling water throughout the amplifier, the water being input and output through nipples 34. Both sides of the laser amplifier plate assembly 26 are pumped by a series of linear flashlamps 28 with their axes parallel to the y axis to assure uniform pumping. The lamps are each located along a focal line of one of a series of diffuse elliptical reflectors 30 which have their second focal line in the plane of the amplifier plate 26. The total flash-lamp energy required is 85 kJ which should be delivered coincidentally with the firing of the input laser 10. If the incident light on the amplifier has an energy density of 0.029 J/cm$^2$, the output of the amplifier will have an energy density of 2.9 J/cm$^2$ over a 10 centimeter by one centimeter area. The intensity variation across the beam will be less than ten percent.

Thus, the above-described preferred embodiment of the apparatus is effective to produce a line of laser light elongated along the y axis and propagated in the direction of the z axis having a large light area of very uniform intensity and having a sufficiently high intensity for the treatment of semiconductor materials as well as for other purposes.

The line forming optics between the laser 10 and the amplifier 22 of FIG. 1 may be replaced by other arrangements for generating a uniform line of light. It will be seen that using the principles of this invention the specific apparatus as described above may be modified in certain particulars and still obtain the high intensity uniform line of light pattern.

The embodiments of the invention in which an exclusive property or privilege is claimed are defined as follows:

1. Apparatus for producing a line of continuous uniform intense laser light perpendicular to the direction of light propagation, comprising a planar laser amplifier comprising a plurality of parallel laser rods nested together to form a plate, and pumping means comprising a plurality of lamps adjacent the plate, a laser for producing a beam of light, and optical means in the light beam for producing several light beams of substantially equal intensity and means for combining the beams into a long narrow line of light of substantially uniform and continuous intensity in the plane of the said plate and introducing the line of light into the ends of the rods in the planar amplifier to produce an intense substantially uniform and continuous intensity line of light output from the amplifier.

2. Apparatus for producing a line of continuous uniform intense laser light perpendicular to the direction of light propagation, comprising a planar laser amplifier having a plurality of parallel laser rods nested together to form a plate, the rods each having a triangular cross-section so that they fit together intimately at adjoining surfaces, and pumping means including a series of linear flashlamps disposed on both sides of the plate, a laser for producing a beam of light, and a phase grating in the light beam for producing several light beams of substantially equal intensity and means for combining the beams into a long narrow substantially uniform line of light of continuous intensity in the plane of the said plate and introducing the line of light into the ends of the rods in the planar amplifier to produce an intense substantially uniform and continuous intensity line of light output from the amplifier.

3. Apparatus for producing a uniform and continuous intensity line of laser light perpendicular to the direction of light propagation, comprising a laser for producing a beam of light, a phase grating in the light beam for producing in the plane of the light beam several slightly divergent beams of substantially equal intensity, collimating means in the paths of the diverging rays to redirect the rays into overlapping parallel paths in the plane to produce a substantially uniform and continuous intensity composite beam of long and narrow cross-section, and a planar laser amplifier in the plane of the composite beam to amplify the intensity of the light and produce an output beam of intense light in a uniform and continuous intensity line.

* * * * *